United States Patent [19]

Lohr, Jr. et al.

[11] 4,139,523
[45] Feb. 13, 1979

[54] STABILIZATION OF POLYPHOSPHAZENE VULCANIZATES WITH A METAL COMPLEX

[75] Inventors: Delmar F. Lohr, Jr., Akron; Russell W. Koch; Donald N. Schulz, both of Hartville, all of Ohio

[73] Assignee: The Firestone Tire & Rubber Company, Akron, Ohio

[21] Appl. No.: 900,833

[22] Filed: Apr. 28, 1978

[51] Int. Cl.² ............................................. C08K 5/29
[52] U.S. Cl. .................... 260/45.75 W; 260/45.9 R
[58] Field of Search ................. 260/45.75 W, 45.9 R, 260/45.8 SN

[56] References Cited

U.S. PATENT DOCUMENTS

| | | | |
|---|---|---|---|
| 2,181,121 | 11/1939 | Downing et al. | 260/45.9 R |
| 2,316,197 | 4/1943 | Tucker | 260/45.8 NW |
| 2,338,187 | 1/1944 | Lewis | 260/45.8 NW |
| 2,615,860 | 10/1952 | Burgess | 260/45.75 W |
| 3,004,949 | 10/1961 | Chevassus | 260/45.75 W |
| 3,055,815 | 9/1962 | Lyons | 260/45.9 R |
| 3,148,936 | 9/1964 | Turbak | 260/45.7 R |
| 3,843,596 | 10/1974 | Kyker et al. | 260/45.75 R |
| 3,867,341 | 2/1975 | Kyker | 260/45.75 W |
| 4,017,458 | 4/1977 | Lohr | 260/45.75 W |
| 4,051,103 | 9/1977 | Lohr et al. | 260/45.75 W |

Primary Examiner—V.P. Hoke

[57] ABSTRACT

When polyphosphazenes are exposed to elevated temperatures, their physical properties often deteriorate. The addition of a stabilizing compound represented by the structure:

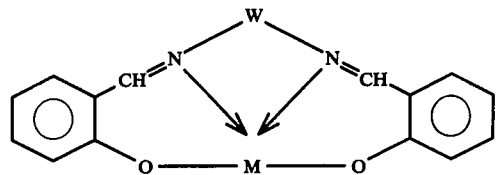

wherein W is —CRR'-CRR'— or

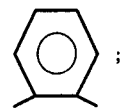

and wherein R and R' are selected from the group consisting of hydrogen, alkyl, cycloalkyl, acyl or a mixture thereof, and M is zinc or magnesium; to polyphosphazene rubbers result in improved retention of the physical properties of such polyphosphazenes. Further, the use of additives of this type does not adversely affect the ability of peroxy compounds to cure the polyphosphazenes to form vulcanizates.

Especially useful compounds represented by the above structural formula are zinc or magnesium 1,2-bis(2-oxybenzylideneamino)ethylene.

14 Claims, No Drawings

STABILIZATION OF POLYPHOSPHAZENE VULCANIZATES WITH A METAL COMPLEX

This invention relates to the stabilization of polyphosphazene vulcanizates against the deleterious effects of exposure to high temperature. More particularly, the invention comprises the incorporation of a particular stabilizer into formulation intended to be vulcanized.

The addition of stabilizers to polyphosphazene elastomers is described in U.S. Pat. No. 3,843,596 issued on Oct. 23, 1974 disclosing the use of metal dialkyl-, alkyl-, aryl- or diaryldithiocarbamates of zinc, lead or bismuth or various inorganic or metallo-organic compounds for this purpose. Another additive useful for the protection of polyphosphazene from thermal degradation when exposed to temperatures up to about 260° C. in various environments are the metal quinolates as described in U.S. Pat. No. 3,867,341 issued Feb. 18, 1975. Still other additives which have been successfully employed for the same purpose include zinc 2-mercaptobenzothiazole, as described in U.S. Pat. No. 4,017,458 issued Apr. 12, 1977 and zinc bis hippurate, as described in U.S. Pat. No. 4,051,103 issued Sept. 27, 1977.

Other stabilizers for similar purposes are described in the open literature.

One objection to some of the stabilizers described in the prior art has been the adverse effect they have on the color of the resulting polymer products, or on the activity of other additives present in the compositions, e.g. on the effectiveness of the curing agents present. Another objection to some of the prior art additives has been their potential toxicity to humans engaged in the preparation of formulations containing the same.

One object of this invention is to stabilize polyphosphazenes against the thermal degradation by means of additives which do not interfere with the curability of the compositions and which do not impart undesired discoloration to the composition and which exhibit no toxicity.

The polyphosphazenes to which the present invention is applicable include those described in the following recent U.S. Pat. Nos.:

Evans 3,271,330 issued Sept. 6, 1966;
Allcock et al. 3,370,020 issued Feb. 20, 1968;
Rose 3,515,688 issued June 2, 1970;
Rose et al. 3,702,833 issued Nov. 14, 1972;
Reynard et al. 3,700,629 issued Oct. 24, 1972;
Reynard et al. 3,853,794 issued Dec. 10, 1974;
Reynard et al. 3,856,712 issued Dec. 24, 1974;
Rose et al. 3,856,713 issued Dec. 24, 1974;
Reynard et al. 3,883,451 issued May 13, 1975;
Cheng et al. 3,972,841 issued Aug. 3, 1976;

and to other linear polymers characterized by repeating sequence of

units in which up to 50,000 or more such units are present, in which various groups are attached to the P atoms, such groups including alkoxy, fluoroalkoxy, aryloxy, amino, arylalkoxy, and other groups, and to the phosphazenes described in a recent article on phosphazene chemistry in Chemical Reviews 1972, Volume 72, No. 4, particularly pages 349-356.

The polymers to which the present invention applies includes both elastomers and thermoplastic materials, Such polymers exhibit a number of desirable properties but are found to degrade when exposed in air to temperatures of the order of about 135° C. or 149° C. or higher for prolonged intervals of time.

In the present specification the term polyphosphazene is intended to include the polymers described in the above noted patents and other similar materials represented by the general formula

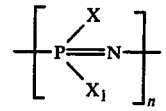

and X and $X_1$ each represent a monovalent substituent such as alkoxy, substituted alkoxy including fluoroalkoxy, aryloxy, substituted aryloxy, amino, and other such groups and the X and $X_1$ groups may all be the same or they may differ and n is an integer greater than 3 and preferably between 20 and 50,000. Some of the X groups may include some unsaturation, e.g. as described in Cheng et al. U.S. Pat. No. 3,972,841 issued Aug. 3, 1976.

Particularly preferred polyphosphazenes are those in which the substituent groups randomly distributed along the —P=N— chain are —OCH$_2$CF$_3$, —OCH$_2$(CF$_2$)$_y$CF$_2$H, in which y is 1, 3, 5, 7 or 9 and mixtures thereof; and o-allylphenoxy groups, in the approximate ratio of 60-70:30-40; about 0.5%, by weight with a molecular number of 20 to 50,000 and a molecular weight distribution generally similar to that described in Table III of a Paper published in the Journal of Polymer Science, Vol. 14, pages 1379-1395 (1976) by D. W. Carlson et al., but it is to be understood that the invention is applicable to a wide variety of polyphosphazene rubbers such as those described in the above noted patents.

As mentioned heretofore, this invention involves, the addition of stabilizer compounds to the above described polyphosphazenes for the purpose of improving the retention of the physical properties of such polyphosphazenes when they are exposed to elevated temperatures. Stabilizer compounds which may suitably be employed for that purpose are those represented by the general structural formula:

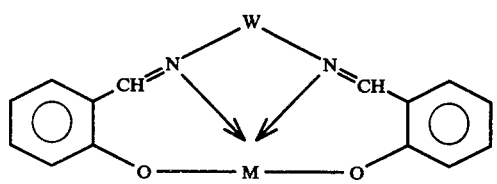

wherein W is —CRR'—CRR'— or

and wherein R and R' are selected from the group consisting of hydrogen, alkyl, cycloalkyl, acyl and mixtures thereof and M is zinc or magnesium.

The preferred compounds for use in the practice of this invention are those in which W in the above formula is —CHR—CHR and R is hydrogen or alkyl. Illustrative of the preferred compounds are compounds such as zinc or magnesium 1,2-bis(2-oxybenzlideneamino)ethylene; 1,2-bis(2-oxybenzlideneamino)-1,2-dimethylethylene; 1,2-bis(2-oxybenzlideneamino)-1,2-diethylethylene and the like.

The particularly preferred compounds for use in the practice of the invention are those in which W in the above formula is —CH$_2$—CH$_2$—. Thus, the chemical formula for the particularly preferred stabilizers is

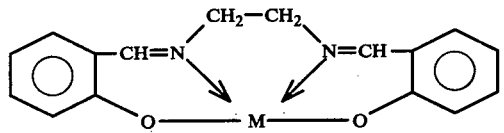

where M is zinc or magnesium.

Of these particularly preferred compounds, the zinc compound is especially advantageous for use in the practice of the invention.

Alternative nomenclature for these particularly preferred compounds is ethylenebis-(salicylimines) or Salen of zinc or magnesium.

The amount of the stabilizers which can be employed in the practice of the invention depends on the degree of retention of the properties exhibited by the polyphosphazene which is desired and ranges from any amount effective for this purpose up to about 5 parts by weight per hundred parts of phosphazene polymer, by weight, a generally preferred range being between about 1 to 4 parts per hundred of polymer, by weight.

The addition of the stabilizer compounds to polyphosphazenes improves the high temperature resistance of polyphosphazene vulcanizates. The following data illustrates the invention as applied to polyphosphazenes in which the substituents were fluoroalkoxy groups (OCH$_2$CF$_3$) and (OCH$_2$(CF$_2$)$_y$H in which y is a mixture of 1, 3, 5, 7 and 9 and containing a small number of o-allylphenoxy groups to enhance curing thereof.

The invention will be further understood from the examples which follow and which are intended to illustrate preferred embodiments of the invention but not to limit the same.

The polymer and filler plus all compounding ingredients except the peroxide curing agent were mixed for 10 minutes in a Brabender mixer. The master batch was cooled to ambient temperature and added to a 55° C. mill and the curing agent added. The batch was then molded into slabs which were cured for 30 minutes at 171° C. Test rings were cut from the slabs and aged 240 hours at 175° C. in a forced air oven. Physical properties of the aged rings were then compared to the unaged controls. Different levels of the stabilizers, zinc or magnesium 1,2-bis(2-oxybenzylideneamino)ethylene were compounded in the following composition:

| MATERIAL | PARTS BY WEIGHT |
|---|---|
| Phosphazene Rubber | 100 |
| Silica (Quso WR 82) | 30 |
| Magnesium Oxide | 6 |
| Vulcup 40 KE* | 0.4–1.5 |
| Stabilizer | as in Table I and II |

*2,2'-bis(t-butylperoxy)diisopropylbenzene

TABLE I
Evaluation of Zinc 1,2-Bis(2-oxybenzylideneamino)ethylene in Standard PNF® 200 Test Stock*

| Sample No. | 1 | 2 | 3 | 4 | 5 | 6 |
|---|---|---|---|---|---|---|
| Stabilizer (phr) | None | 2 | 8 | 9 | 10 | 11 |
| Shore A Hardness | 57 | 57 | 58 | 57 | 58 | 59 |
| Compression Set, % | 18 | 39 | 29 | 35 | 39 | 39 |
| Modulus at 100% Elongation, MPa | | | | | | |
| Unaged | 5.8 | 4.6 | 4.8 | 5.8 | 5.0 | 4.9 |
| 240 Hrs. at 175° C. | 4.6 | 6.7 | 6.1 | 5.7 | 5.9 | 6.0 |
| Retention, % | 79 | 146 | 127 | 198 | 118 | 122 |
| Tensile Strength, MPa | | | | | | |
| Unaged | 8.9 | 8.0 | 8.9 | 9.0 | 9.1 | 7.7 |
| 240 Hrs. at 175° C. | 8.0 | 9.3 | 9.6 | 9.4 | 8.2 | 8.6 |
| Retention, % | 90 | 116 | 108 | 104 | 90 | 112 |
| Elongation at Brk., % | | | | | | |
| Unaged | 130 | 140 | 150 | 130 | 140 | 130 |
| 240 Hrs. at 175° C. | 150 | 140 | 150 | 150 | 130 | 140 |

PNF® 200 is a polyphosphazene copolymer containing approximately 65 percent of —OCH$_2$CF$_3$, 35 percent of —OCH$_2$(CF$_2$)$_y$H (y = a mixture of 1,3,5,7,9) and 0.5 percent of o-allylphenoxy.

TABLE II
Evaluation of Magnesium 1,2-Bis(2-oxybenzylideneamino)ethylene in Standard PNF® 200 Test Stock

| Sample No. | 7 | 8 | 9 | 10 | 11 |
|---|---|---|---|---|---|
| Stabilizer (phr) | None | 1 | 2 | 3 | 4 |
| Shore A Hardness | 61 | 57 | 60 | 59 | 62 |
| Compression Set, % | 15 | 43 | 39 | 40 | 40 |
| Modulus at 100% Elongation, MPa | | | | | |
| Unaged | 8.2 | 6.2 | 6.4 | 6.0 | 7.1 |
| 240 Hrs. at 175° C. | 4.0 | 4.3 | 5.5 | 6.3 | 7.1 |
| Retention, % | 49 | 69 | 86 | 105 | 100 |
| Tensile Strength, MPa | | | | | |
| Unaged | 8.2 | 9.2 | 9.4 | 9.0 | 8.8 |
| 240 Hrs. at 175° C. | 5.8 | 6.5 | 7.3 | 7.9 | 8.1 |
| Retention, % | 71 | 71 | 78 | 88 | 92 |
| Elongation at Brk., % | | | | | |
| Unaged | 100 | 140 | 140 | 130 | 120 |
| 240 Hrs. at 175° C. | 140 | 160 | 140 | 130 | 120 |

TABLE III
Evaluation of 1,2-Bis(2-oxybenzylideneamino)ethylene in Standard PNF Test Stock

| Sample No. | 12 | 13 | 14 | 15 |
|---|---|---|---|---|
| Stabilizer (phr) | 1.0 | 2.0 | 3.0 | 4.0 |
| Shore A Hardness | 57 | 56 | 62 | 63 |
| Compression Set, % | 40 | 37 | 37 | 35 |
| Modulus at 100% Elongation, MPa | | | | |
| Unaged | 4.7 | 3.0 | 4.8 | 4.8 |
| 240 Hrs. at 175° C. | 3.0 | 2.8 | 5.6 | 6.0 |
| Retention, % | 64 | 93 | 116 | 125 |
| Tensile Strength, MPa | | | | |
| Unaged | 9.2 | 9.2 | 9.1 | 9.6 |
| 240 Hrs. at 175° C. | 5.5 | 5.4 | 7.8 | 8.2 |
| Retention, % | 60 | 57 | 86 | 85 |
| Elongation at Brk., % | | | | |
| Unaged | 160 | 200 | 170 | 170 |
| 240 Hrs. at 175° C. | 180 | 200 | 150 | 150 |

TABLE IV
Evaluation 1,2-Bis(2-oxybenzylideneamino)ethylene in Test Stock Containing Zinc Oxide

| Sample No. | 16 | 17 | 18 | 19 | 20 |
|---|---|---|---|---|---|
| Stabilizer (phr) | None | 1 | 2 | 3 | 4 |
| Shore A Hardness | 56 | 54 | 56 | 59 | 64 |
| Compression Set, % | 14 | 21 | 25 | 29 | 29 |
| Modulus at 100% Elongation, MPa | | | | | |
| Unaged | 6.8 | 5.1 | 5.0 | 5.9 | 6.1 |
| 240 Hrs. at 175° C. | 3.2 | 3.8 | 4.0 | 4.4 | 4.6 |
| Retention, % | 47 | 75 | 80 | 75 | 75 |
| Tensile Strength, MPa | | | | | |
| Unaged | 9.1 | 9.3 | 9.4 | 9.4 | 9.5 |
| 240 Hrs. at 175° C. | 6.5 | 8.2 | 7.3 | 7.8 | 7.2 |
| Retention, % | 71 | 88 | 78 | 83 | 76 |

TABLE IV-continued

| | Evaluation 1,2-Bis(2-oxybenzylidene-amino)ethylene in Test Stock Containing Zinc Oxide | | | | |
|---|---|---|---|---|---|
| Sample No. | 16 | 17 | 18 | 19 | 20 |
| Elongation at Brk., % | | | | | |
| Unaged | 120 | 140 | 140 | 130 | 130 |
| 240 Hrs. at 175° C | 160 | 170 | 150 | 160 | 150 |

We claim:

1. A polyphosphazene composition stabilized against thermal aging comprising (1) a polyphosphazene represented by the general formula:

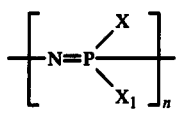

wherein n represents an integer from 20 up to about 50,000 and X and $X_1$ each represent a monovalent substitutent selected from the groups consisting of alkoxy, substituted alkoxy, aryloxy, substituted aryloxy and amino, and X and $X_1$ are randomly distributed groups along the —P=N— backbone and (2) a stabilizer consisting of an organic compound compatible with said polyphosphazene and present in an amount sufficient to stabilize said polyphosphazene against thermal degradation, said organic compound being represented by the structure:

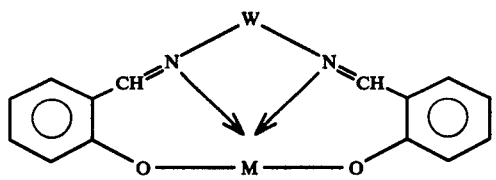

wherein W is —CRR'-CRR'— or

and wherein R and R' are selected from the group consisting of hydrogen, alkyl, cycloalkyl, acyl or mixtures thereof, and M is zinc or magnesium.

2. The composition of claim 1 wherein said stabilizer is present in an effective amount up to 5.0 percent by weight of polyphosphazene.

3. The composition of claim 1 wherein said stabilizer is zinc or magnesium 1,2-bis(2-oxybenzylideneamino) ethylene.

4. The stabilized polyphosphazene composition of claim 1 wherein X and $X_1$ are fluoroalkoxy or fluoroaryloxy groups.

5. Elastomers consisting essentially of the stabilized polyphosphazenes of claim 1.

6. Plastics consisting essentially of the stabilized polyphosphazenes of claim 1.

7. Thermoplastic elastomers consisting essentially of the stabilized polyphosphazenes of claim 1.

8. Fibers consisting essentially of the stabilized polyphosphazenes of claim 1.

9. Vulcanized articles consisting essentially of the stabilized polyphosphazenes of claim 1.

10. Peroxide cured polyphosphazene compositions of claim 1 in which from 0.2 to 0.5 percent of the groups X or $X_1$ are unsaturated.

11. The compositions of claim 10 in which the groups X and $X_1$ are trifluoroethoxy, $OCH_2(CF_2)_yCF_2H$ and o-allylphenoxy in which y is either 1, 3, 5, 7 or 9 and mixtures thereof.

12. The composition of claim 11 in which the molar ratio in % of trifluoroethoxy to telomer fluoroalkoxy is between 70:30 and 30:70 and which contains in addition from 0.2 to 5.0 weight % o-allylphenoxy groups.

13. The composition of claim 1 in which said organic metal compound is a compound of zinc.

14. The composition of claim 1 in which said organic metal compound is a compound of magnesium.

* * * * *